United States Patent [19]
Kono et al.

[11] Patent Number: 6,052,254
[45] Date of Patent: *Apr. 18, 2000

[54] TWO-PART ROTATABLE COVER APPARATUS FOR TAPE CASSETTE WITH LOCK MECHANISM

[75] Inventors: Kazunori Kono, Hirakata; Koutarou Kashima, Nara-ken; Masayoshi Yano, Hirakata, all of Japan; Tatsuo Mizukami, Singapore, Singapore; Hiroshi Nakamori, Hirakata; Koji Nakahara, Sakai, both of Japan

[73] Assignee: Matsushita Electric Industrial Co., Ltd., Osaka, Japan

[*] Notice: This patent is subject to a terminal disclaimer.

[21] Appl. No.: 08/074,546

[22] Filed: Jun. 11, 1993

[30] Foreign Application Priority Data

Jun. 11, 1992 [JP] Japan ................................ 4-151743

[51] Int. Cl.$^7$ ................................................ G11B 15/675
[52] U.S. Cl. ............................................................ 360/96.6
[58] Field of Search ............................... 360/96.5, 96.6; 369/77.1, 77.2, 78, 79; D14/163, 165

[56] References Cited

U.S. PATENT DOCUMENTS 4,628,498  12/1986  Takamatsu et al. ............... 369/77.1
5,432,660  7/1995  Kono et al. .......................... 360/96.6

FOREIGN PATENT DOCUMENTS 6120249  1/1986  Japan ................................. 360/96.6
2211980  7/1989  United Kingdom .

*Primary Examiner*—William R. Korzuch
*Attorney, Agent, or Firm*—Pollock, Vande Sande & Amernick

[57] ABSTRACT

A cover apparatus of a cassette tape recorder comprising first and second covers rotatable to be openable and closable with respect to a body of the tape recorder. The first cover has a holder to encasing a tape cassette so that the tape cassette encased in the holder is rotatable in accordance with the rotation of the first cover, a length of the first cover in longitudinal directions being smaller than that of the tape cassette so that a portion of the tape cassette protrudes from the first cover when being encased in the holder. The second cover is arranged to be engaged with the first cover to be rotatable together with the first cover and movable along a surface of the first cover. The second cover, together with the first cover, rotates to cover the entire tape cassette when the first cover is closed with respect to the tape recorder body, and further the second cover moves with respect to the first cover when the first cover is opened with respect thereto, so that the portion of the tape cassette protrudes from tip portions of the first and second covers. This arrangement allows the user to easily take out the tape cassette from the tape recorder.

13 Claims, 10 Drawing Sheets

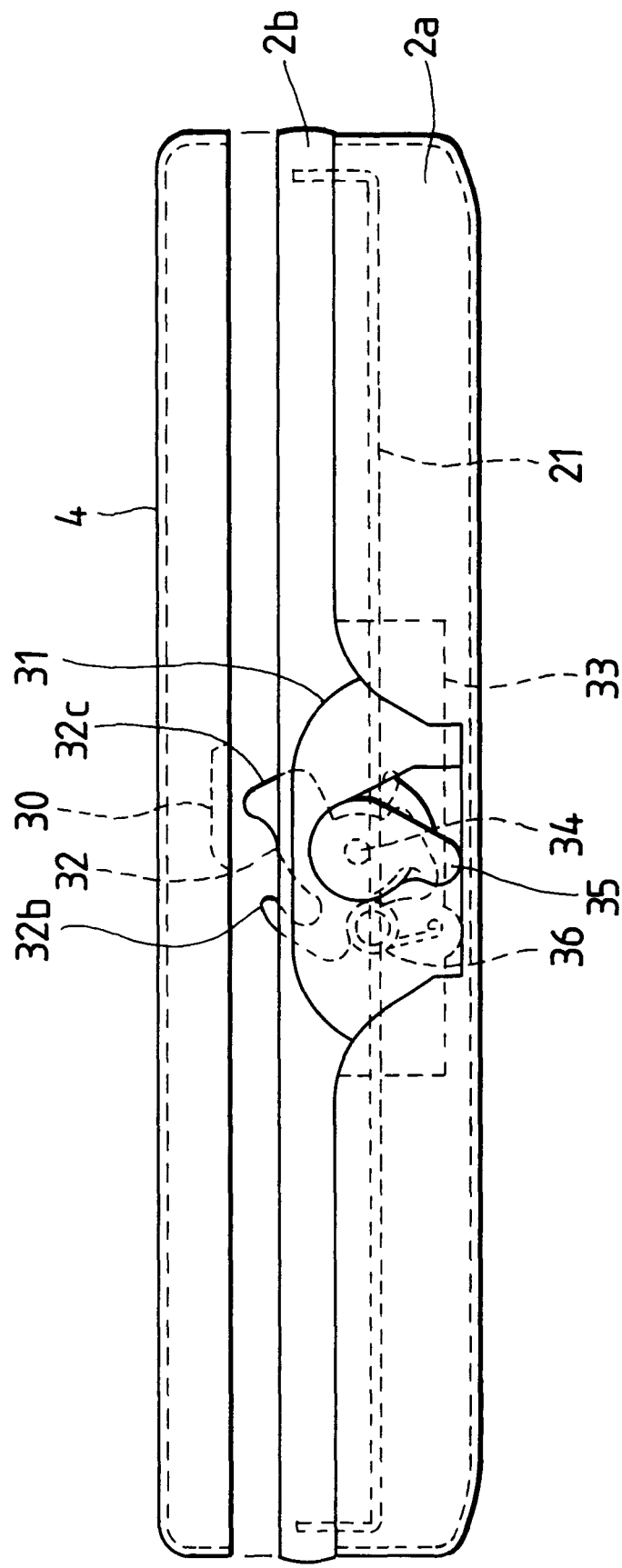

TWO-PART ROTATABLE COVER APPARATUS FOR TAPE CASSETTE WITH LOCK MECHANISM

BACKGROUND OF THE INVENTION

The present invention relates to a tape cassette cover apparatus rotatable together with a tape cassette holder to be openable and closable with respect to a tape recorder body.

A type of cassette tape recorder has a cover apparatus which acts as a portion of a tape cassette holder for encasing a tape cassette as exemplified by the Japanese Patent Publication No. 63-31244. This cassette tape recorder is arranged such that as illustrated in FIG. 15 a cover 61 is rotatable about a shaft 63a of a supporting section 63 provided in the tape recorder body 62 and a holding member 65 for encasing a tape cassette 64 (see FIGS. 16 and 17) is disposed along the cover 61. Further, a head section 66 is fixed to a root portion side of the holding member 65 to be integrally rotatable together with the holding member 65. Numeral 67 is a capstan vertically provided in the tape recorder body 62. In this cassette tape recorder, for encasing the tape cassette 64, as illustrated in FIG. 17 the cover 61 is greatly opened to be separated from the capstan 67 and then closed after the tape cassette 64 is inserted into the holding member 65 to advance toward the head section 66 provided at the cover 61 side. On the other hand, for taking out the tape cassette from the tape recorder, the cover 61 is similarly greatly opened as illustrated in FIG. 17 and the tape cassette 64 is picked up to be drawn from the holding member 65. Further, in such a type of tape recorder, for size-reduction of the tape recorder, a tip portion of the cover 61 is arranged to also act as a portion of one surface of the tape recorder, and for increasing the strength of the cover 61, the tip portion 61a of the cover 61 is curved toward the tape recorder body 62 side. The tape cassette 64 is, as shown in FIGS. 16 and 17, slightly separated from the cover 61 by means of a plate spring 65a, fixed to the holding member 65, when the cover 61 takes the opening state so that an edge portion of the tape cassette 64 is inclined from the tip portion 61a of the cover 61 toward the tape recorder body 62 side so as to easily insert and take out the tape cassette 64 into and from the holding member 65.

However, such a conventional tape recorder has been disadvantageous in that, even if the cover 61 is opened to take out the tape cassette 64, the distance between the edge portion of the tape cassette 64 and the curved tip portion 61a of the cover 61 is short so that the covers substantially cover one surface of the tape cassette 64 as before, and therefore, the user is required to surely hold both the sides 64a of the small-sized tape cassette 64 and take it out. This complicates the easy taking-out of the tape cassette 64 by the user.

SUMMARY OF THE INVENTION

It is therefore an object of the present invention to provide a cassette tape cover apparatus for use in a tape recorder which is capable of easily taking out the tape cassette from the tape recorder.

According to the present invention, there is provided a cove r apparatus of a cassette tape recorder comprising: a first cover rotatable to be openable and closable with respect to a body of the tape recorder, the first cover having holding means to encase a tape cassette so that the tape cassette encased in the holding means is rotatable in accordance with the rotation of the first cover, a length of the first cover in the longitudinal directions being smaller than that of the tape cassette so that a portion of the tape cassette protrudes from the first cover when being encased in the holding means; and a second cover engaged with the first cover to be rotatable together with the first cover and movable along the first cover, the second cover rotating to cover the entire tape cassette in cooperation with the first cover when the first cover is closed with respect to the tape recorder body, and the second cover moving in substantially parallel with respect to the first cover to overlap with the first cover when the first cover is opened by a predetermined amount with respect thereto, so that the portion of the tape cassette protrudes from a tip portion of the second cover.

Preferably, the cover apparatus further includes an arm mechanism comprising a first arm one end portion of which is rotatably supported by the tape recorder body, a second arm one end portion of which is coupled to the other end portion of the first arm a nd the other end portion of which is rotatably supported by the first cover, and a third arm one end portion of which is coupled to a substantial center portion of the second arm and the other end portion of which is rotatably supported by the second cover. The arm mechanism rotates the first and second covers to cover the entire tape cassette when the first cover is closed with respect to the tape recorder body, and moves the second cover with respect to the first cover when the first cover is opened with respect thereto, so that the portion of the tape cassette protrudes from the tip portion of the second cover. More preferably, the cover apparatus comprises a lock mechanism comprising an operating lever, a lock cam rotatably provided in the tape recorder body and an engaging member provided on the second cover, the lock cam being engageable with the engaging member when the first cover takes a closing state with respect to the tape recorder body, and disengageable therewith by an operation of the operating lever. The lock cam is biased by a toggle spring to bias the engaging member in a first direction that the second cover closes, when being engaged with the engaging member, and is biased by the toggle spring in a second direction opposite to the first direction when being disengaged with the engaging member.

In addition, according to this invention, there is provided a cover apparatus of a cassette tape recorder comprising: a first cover rotatable to be openable and closable with respect to a body of the tape recorder, the first cover having holding means to encase a tape cassette so that the tape cassette encased in the holding means is rotatable in accordance with the rotation of the first cover, a length of the first cover in the longitudinal directions being smaller than that of the tape cassette so that a portion of the tape cassette protrudes from the first cover when being encased in the holding means; and a second cover coupled to the first cover to be rotatable together with the first cover and additionally rotatable independently of the first cover, the second cover rotating together with the first cover to cover the entire tape cassette in cooperation with when the first cover is closed with respect to the tape recorder body, and the second cover additionally and independently rotating when the first cover is opened by a predetermined amount with respect thereto, so that the portion of the tape cassette is released from the covering state by the second cover.

Preferably, the cover apparatus includes an arm mechanism comprising a first arm one end portion of which is rotatably supported by the tape recorder body and a second arm one end portion of which is rotatably supported by the first cover and the other end portion of which is coupled to the other end portion of the first arm, the arm mechanism rotating the first and second covers to cover the tape cassette when the first cover is closed with respect to the tape recorder body, and additionally and independently rotating the second cover when the first cover is opened with respect thereto, so that the portion of the tape cassette is released from the covering state by the second cover.

BRIEF DESCRIPTION OF THE DRAWINGS

The object and features of the present invention will become more readily apparent from the following detailed description of the preferred embodiments taken in conjunction with the accompanying drawings in which:

FIG. 7 is a front view showing a closed state of the cover apparatus;

DETAILED DESCRIPTION OF THE INVENTION

Figure 1:
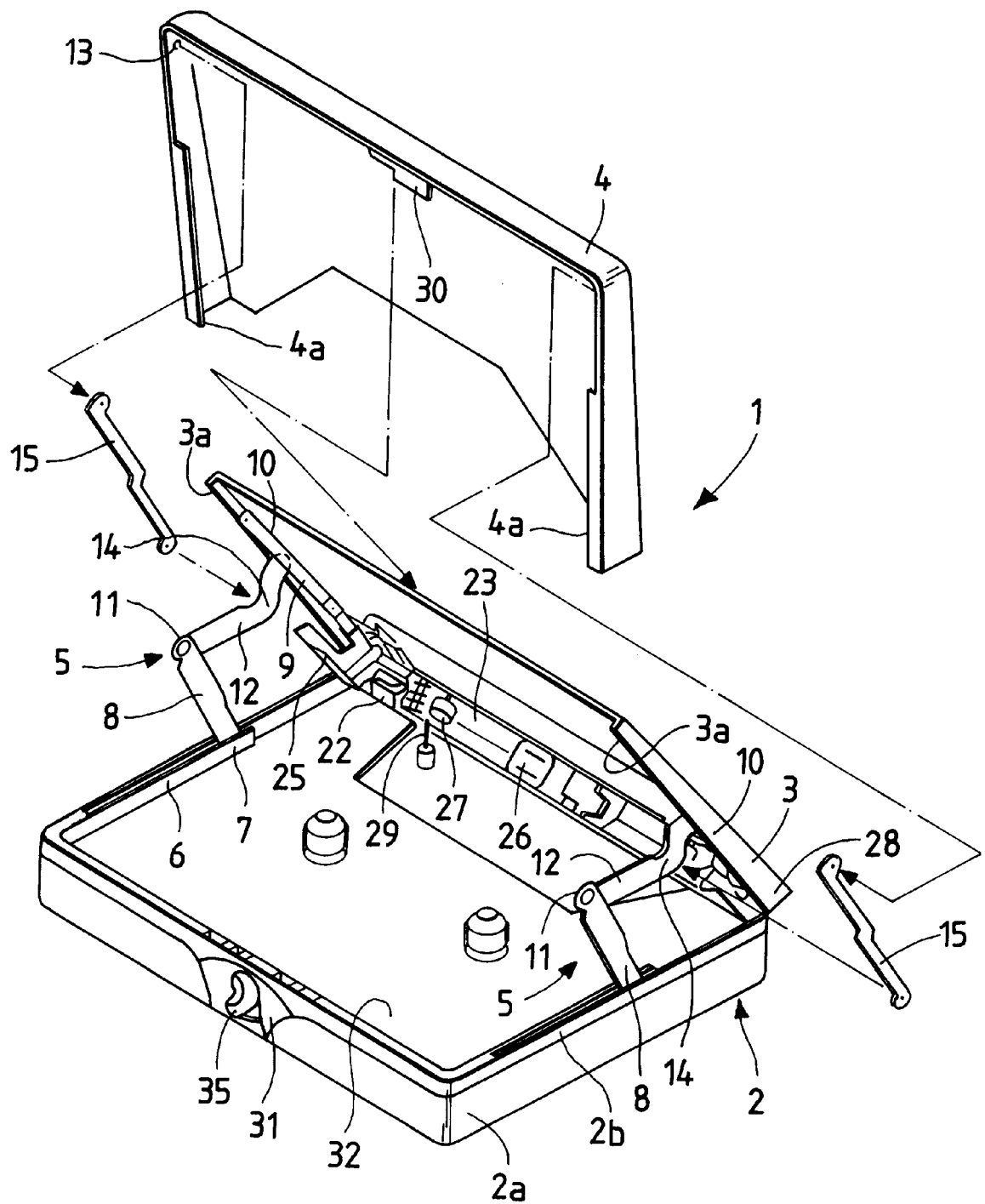
FIG. 1 is an exploded perspective view showing a cassette tape recorder including a cover apparatus according to a first embodiment of the present invention.
Figure 2:
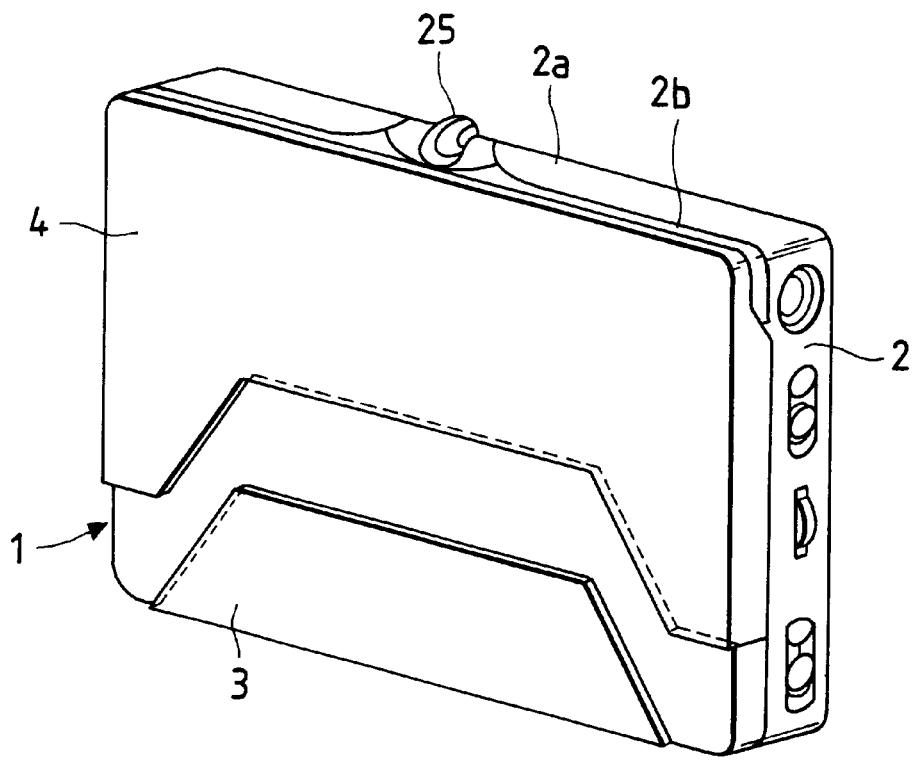
FIG. 2 is a perspective view showing the tape recorder the cover apparatus of which takes the closed state.
Figure 3:
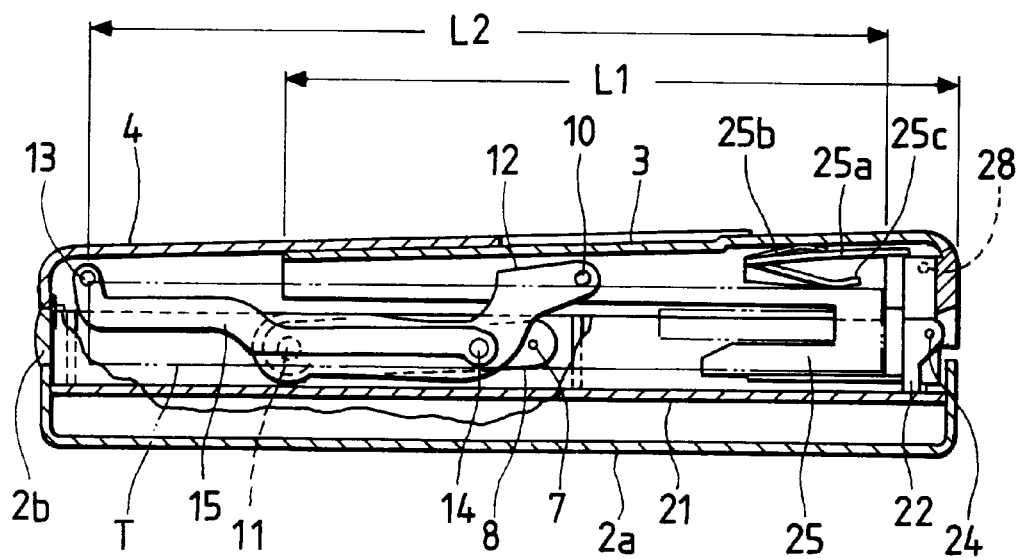
FIG. 3 is a partially cutaway side view showing the tape recorder the cover apparatus of which also takes the closed state.

Referring now to FIGS. 1 to 13, a description will be made hereinbelow in terms of a cover apparatus of a tape recorder according to a first embodiment of this invention. In FIG. 1, a tape cassette cover, designated at numeral 1, comprises two portions: a primary cover portion 3 supported to be openable and closable with respect to a tape recorder body 2 and a secondary cover portion 4 partially overlapped with the primary over portion 3 and supported to be slidable with respect to the primary cover portion 3. The secondary cover portion 4 has at its side and lower portions, guide projecting edges 4a extending from side portions of the secondary cover portion 4 toward the inside of the secondary cover portion 4 and in substantial parallel to a lower surface thereof, and the guide projecting edges 4a respectively engage with side members 3a of the primary cover portion 3 vertically and downwardly protruding from a lower surface of the primary cover portion 3. The secondary cover portion 4 is slidable with respect to the primary cover portion with the guide projecting edges 4a being engaged with the side members 3a. Here, as illustrated in FIG. 3, the dimension (length in directions perpendicular to the longitudinal directions) L1 of the primary cover portion 3 in the longitudinal directions (the directions of the axis passing through the front and rear sides) is arranged to be smaller than the dimension L2 of a tape cassette T in the longitudinal directions. The tape cassette T generally has a dimension that the length in the longitudinal directions is shorter than the length in the lateral directions.

As shown in FIGS. 1 and 3, a pair of arm mechanisms 5 are provided at both side portions and between the tape recorder body 2 and the cover 1. Each of the pair of arm mechanisms 5 comprises a first arm 8 one end portion of which is rotatably supported by a shaft 7 planted in a first mounting plate 6 attached along an upper portion of an inner surface of the tape recorder body 2, also, a second arm 12 one end portion of which is coupled through a shaft 11 to the other end portion of the first arm 8 and the other end portion of which is rotatably supported by a shaft 10 planted in a second mounting plate 9 attached along a lower portion of an inner surface (side member 3a) of the primary cover portion 3, and a third arm 15 one end portion of which is coupled to a shaft 14 planted in a substantial center portion of the second arm 12 and the other end portion of which is rotatably supported by a shaft 13 planted in a front portion of an inner surface of the side portion of the secondary cover portion 4. As illustrated in FIGS. 2 and 3, when the cover 1 takes the closed state, the tape cassette Y is completely covered by both the primary cover portion 3 and secondary cover portion 4.

Figure 4:
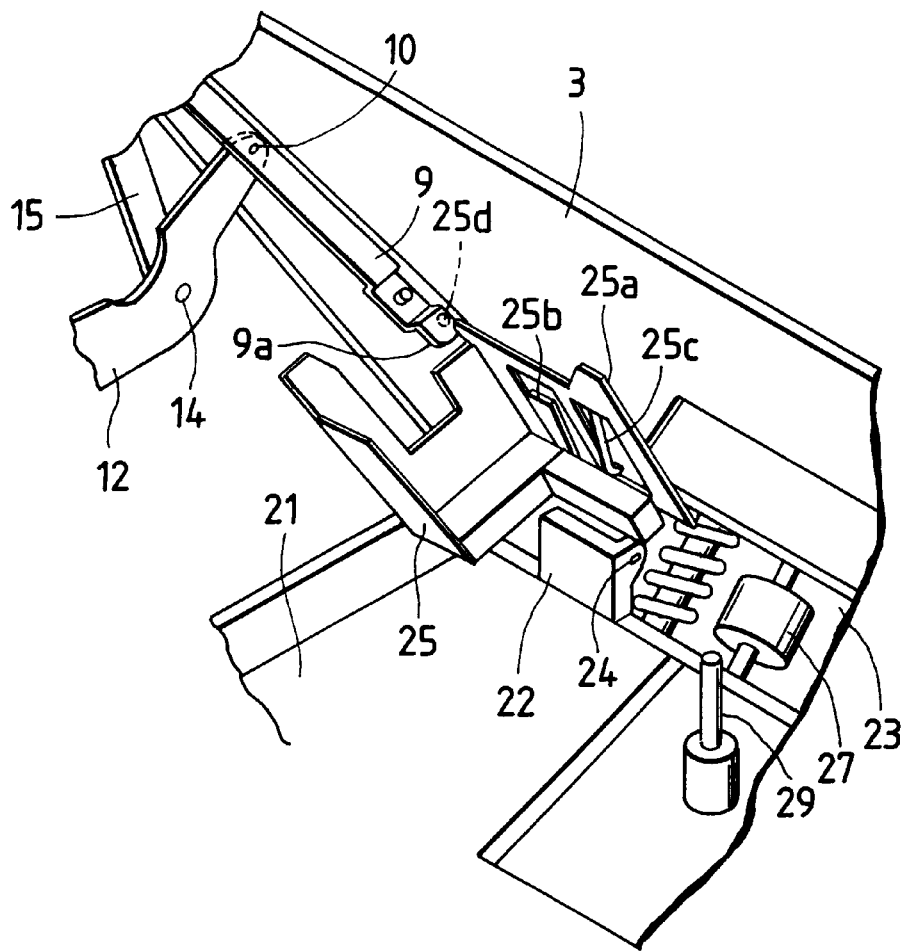
FIG. 4 is a partially perspective view showing the cover apparatus when taking the opening state.

In FIG. 4 partially showing the cover apparatus when taking the opening state, denoted at numeral 21 is a mechanism chassis provided within the tape recorder body 2. This mechanism chassis 21 has at its rear and side portions supporting members 22 having a shaft 24 to rotatably support a holder chassis 23. To this holder chassis 23 there are attached a pair of holding members 25 for holding both side portions of the tape cassette T to encase the tape cassette T and further attached a recording/reproduction head section including a head (see FIG. 1) and a pinch roller 27. Moreover, in an upper plate 25a of each of the holding members 25 there are formed a plate spring 25b coming into contact with the lower (inside) surface of the primary cover portion 3 to press the primary cover portion 3, a plate spring 25c coming into contact with the upper surface of the tape cassette T inserted into the holding members 25 to press the tape cassette T, and a projection 25d protruding in a longitudinal and outside direction of the tape cassette T (or the tape recorder) to come into contact with a control plate 9a of the second mounting plate for the positional control. The primary cover portion 3 is biased by the plate spring 25b so as to be rotated about a shaft 28 (see FIG. 1), provided on the holder chassis 23, by a predetermined angle whereby the projection 25d of the holding member 25 comes into contact with the inner surface of the primary cover portion 3 or the control plate 9a of the second mounting plate 9. This rotation is made in a pop-up range from a completely cover-closed state shown in FIG. 3 up to a slightly coveropening state shown in FIG. 5. The primary cover portion 3 is further opened about the shaft 24 from this pop-up state so that the tape cassette T can be inserted into the holding members 25 without coming into contact with mechanism parts such as a capstan 29.

Figure 6:
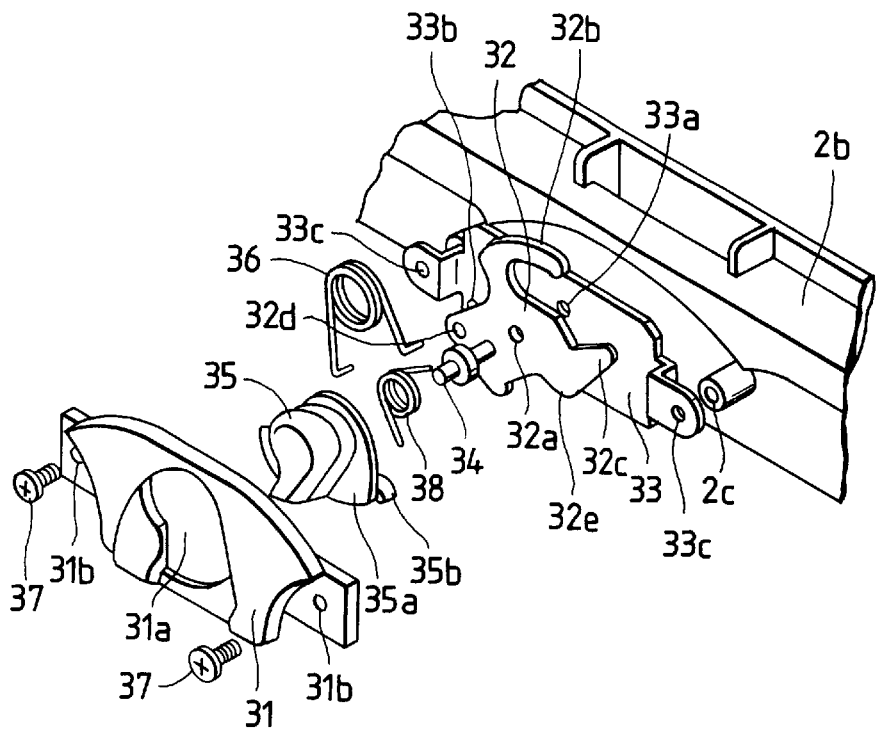
FIG. 6 is an exploded view showing a lock mechanism in the cover apparatus according to the first embodiment.

As shown in FIG. 1, the tape recorder body 2 comprises a main cabinet 2a and an intermediate cabinet 2b. This intermediate cabinet 26 is, as illustrated in FIG. 6, equipped with a control ornament 31 and a lock cam supporting base 33 for rotatably supporting a lock cam 32. The lock cam 32 is rotatably supported by a rotating shaft 34 fitted in a hole 33a of the lock cam supporting base 33. Further, an operating lever 35 is rotatably supported by the rotating shaft 34. This operating lever 35 is fitted in a center hole 31a of the control ornament 31 so that the lock cam 32 is rotationally operated by the operating lever 35 at the time of closing the cover 1. The lock cam 32 takes a position to be in opposed relation to an engaging member 30 provided at a front and center portion of the secondary cover portion 4. Further, the lock cam 32 is equipped with an engaging claw 32b engageable with the engaging member 30 of the secondary cover portion 4 and a pressing portion 32c protruding toward the engaging member 30 side when the cover 1 takes the opening state as illustrated in FIG. 7. Moreover, the lock cam 32 has a spring-operated portion 32d provided in the opposite position to the pressing portion 32c with respect to the rotating shaft 34 and a toggle spring 36 provided between the spring-operated portion 32d and a spring-supporting portion 33b of the lock cam supporting base 33. The lock cam supporting base 33 has fitting holes 33c to bosses 2c formed on the intermediate cabinet 2b and the control ornament 31 also has fitting holes 31b to the same bosses 2c so that the control ornament 31, together with the lock cam supporting base 33, is attached to the intermediate cabinet 2c with screws 37 being engaged through the fitting holes 31b and 33c with the bosses 2c. Further, the operating lever 35 is provided with a flat plate portion 35a for covering the center hole 31a of the control ornament 31 and a projection 35b acting as an application point for rotationally operating the lock cam 32 at the time of opening the cover 1. The operating lever 35 is always rotationally urged clockwise by a spring (coil spring) 38. The projection 35b of the operating lever 35 comes into contact with a lower circumferential surface 32e of the pressing portion 32c of the lock cam 32 to press the lock cam 32 at the time of an opening operation of the cover 1 which will be described hereinafter.

Figure 5:
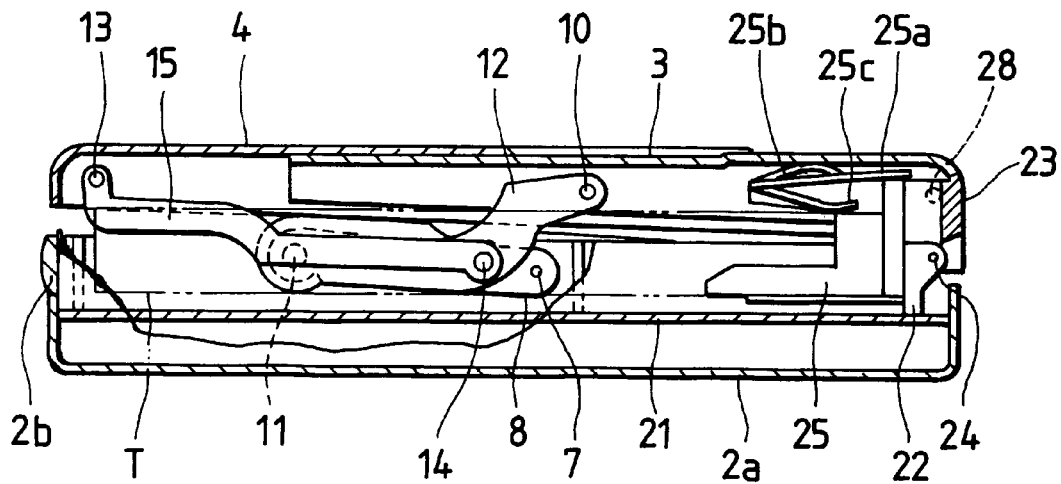
FIG. 5 is a partially cutaway side view showing a state that the cover apparatus takes a pop-up state.
Figure 8:
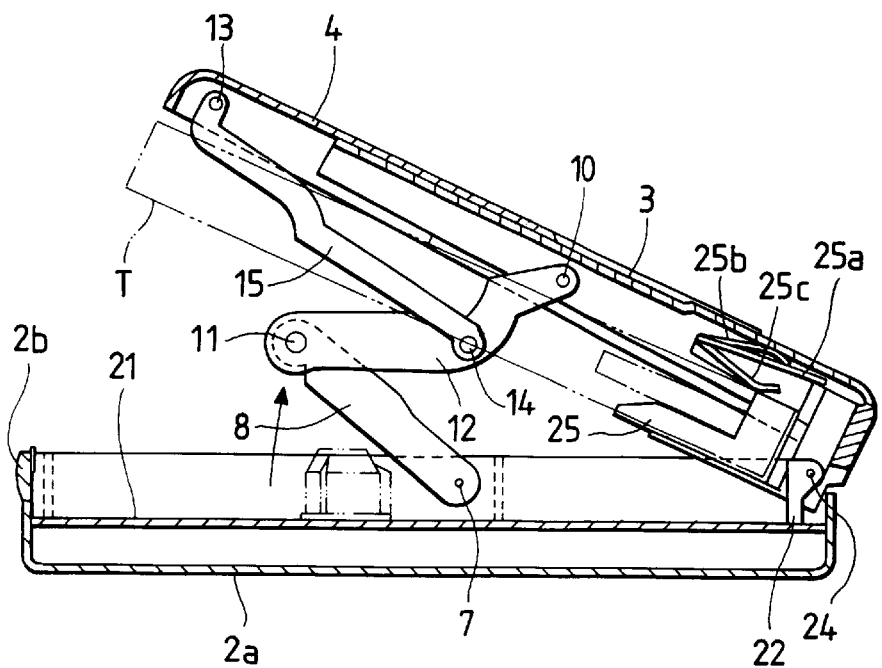
FIG. 8 is a partially cutaway side view showing an opening state of the cover apparatus.
Figure 9:
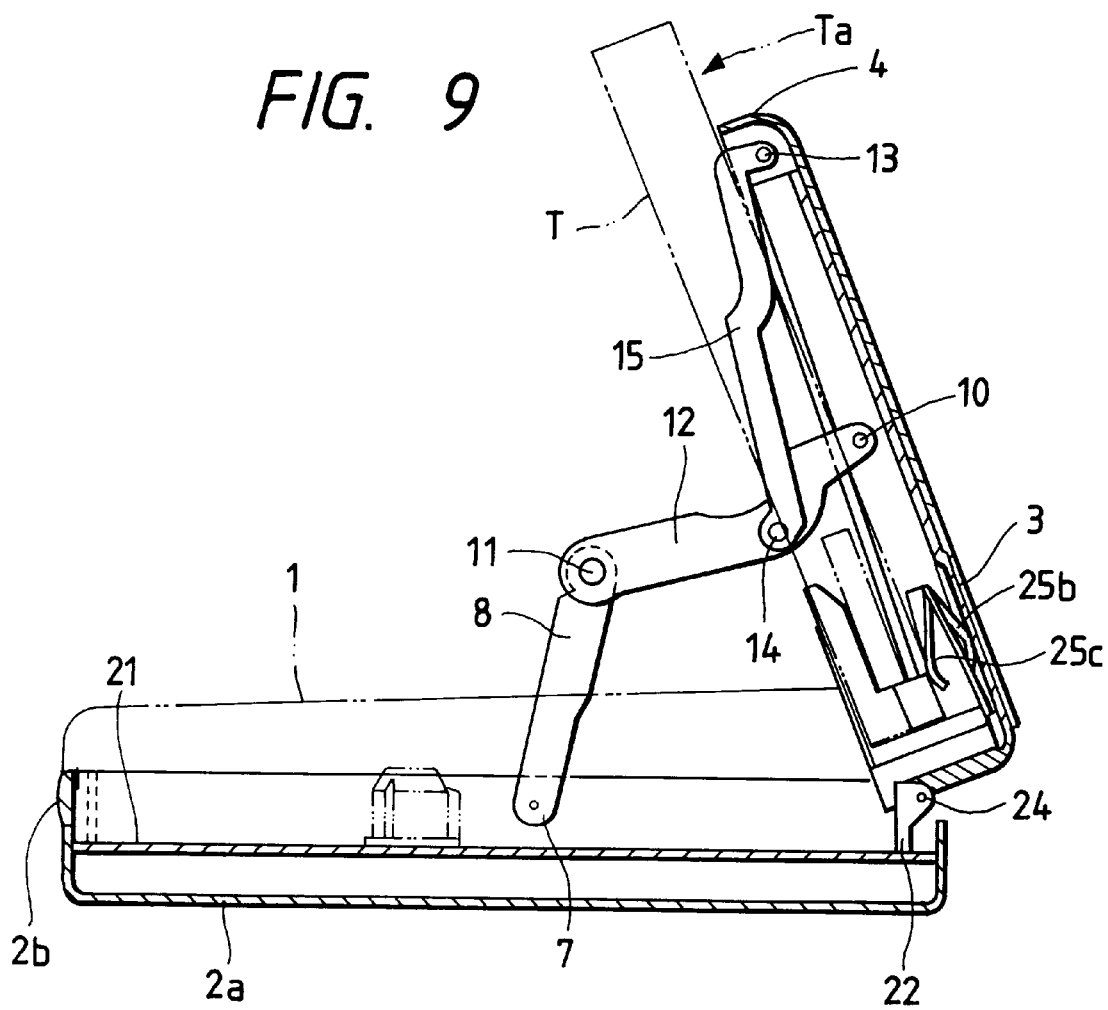
FIG. 9 is a partially cutaway side view showing an opening state of the cover apparatus.

Secondly, a description will be made in terms of an operation of the above-described cover apparatus. The description will first be made in terms of the operation of the primary cover portion 3 and the secondary cover portion 4 from the cover-closed state to the cover-opening state. In response to moving the operating lever 35, the lock cam 32 is disengaged with the engaging member 30 of the secondary cover portion 4 so that the cover 1 takes the pop-up state as illustrated in FIG. 5. When further rotationally moving the cover 1, the primary cover portion 3, tape cassette T, holding members 25 and others are rotated about the shaft 24 as shown in FIG. 8. At this opening time, the first arm 8 obliquely moves upwardly about the shaft 7 as indicated by an arrow, and in accordance with the rotational movement of the first arm 8, the second arm 12 coupled through the shaft 11 obliquely moves downwardly about the shaft 10 of the primary cover portion 3. Moreover, in accordance with the rotational movement of the second arm 12, the shaft 14 provided on the second arm 12 moves to the holding member 25 side and hence the third arm 15 coupled to the shaft 14 is drawn toward the rear side of the tape recorder. As a result, the secondary cover portion 4 coupled to the third arm 15 is also drawn to the rear side, i.e., to the primary cover portion 3 side, so that as shown in FIG. 9 most of the secondary cover portion 4 is overlapped with the primary cover portion 3 when the secondary cover portion 4 reaches the opened position, whereby a portion (front portion) Ta of the tape cassette T is obliquely and upwardly protruded from the tip portion of the secondary cover portion 4. Thus, it is possible to easily take out the tape cassette T from the holding members 25 by holding the protruding portion Ta of the tape cassette T.

Similarly, for mounting the tape cassette T on the tape recorder when the cover 1 takes the opening state, since the secondary cover portion 4 is drawn to the primary cover portion 3 so that most of the secondary cover portion 4 is overlapped with the primary cover portion 3, it is possible to easily insert the tape cassette T in the holding members 25 by holding the front portion Ta of the tape cassette T. Thereafter, with the secondary cover portion 4 being upwardly pulled to close the cover 1, the secondary cover portion 4 is moved in the separating direction from the primary cover portion 3 so that as illustrated in FIG. 3 the tape cassette T is completely covered by the primary cover portion 3 and the secondary cover portion 4.

Figure 10:
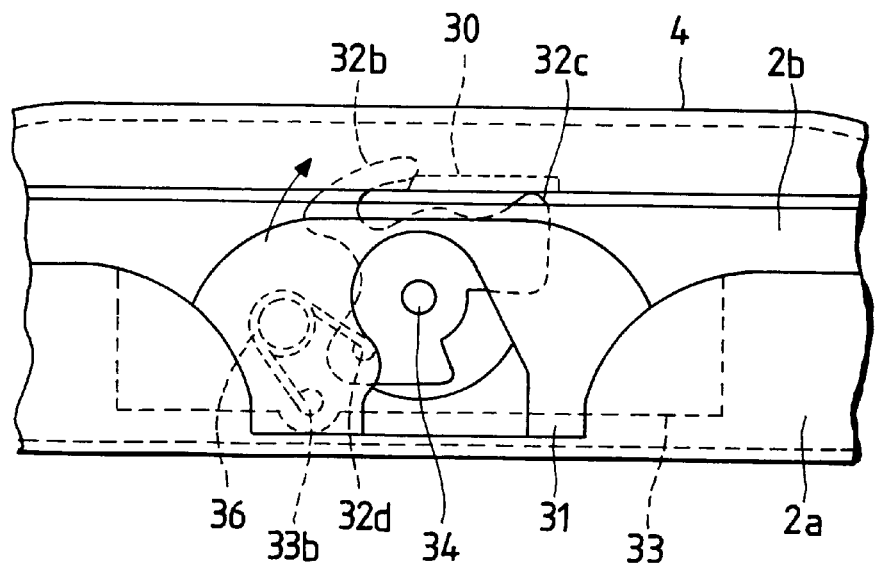
FIGS. 10 to 13 are partial and front views for describing an operation of the lock mechanism.
Figure 11:
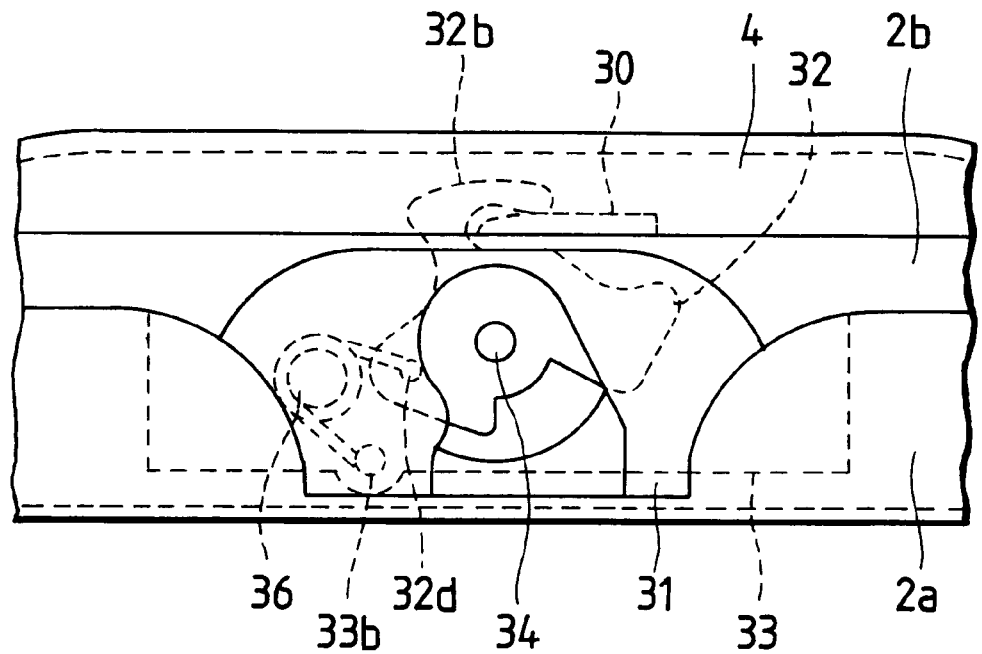

Further, a description will be made hereinbelow in terms of the operation of the lock mechanism. First, if in the cover-opening state as illustrated in FIG. 7, i.e., in a first biasing state that the lock cam 32 is biased counterclockwise by the toggle spring 36, the cover 1 is closed against the biasing force of the toggle spring 36, a state as illustrated in FIG. 10 is taken. In the FIG. 10 state, the engaging claw 32b is engaged with the end portion of the engaging member 30, the spring-operated portion 32d of the lock cam 32 is positioned on the connection line between the axis of the rotating shaft 34 and the spring-supporting portion 33b, and the toggle spring 36 takes the middle position. Accordingly, even if the cover 1 is slightly pressed in the cover-closing direction from the FIG. 10 state, due to the biasing force of the toggle spring 36 the lock cam 32 is rotated in a direction indicated by an arrow in FIG. 10 whereby the cover 1 enters into the closed state as illustrated in FIG. 11. In the FIG. 11 state, the toggle spring 36 becomes in a stable state which is a second biased state to clockwise bias the lock cam 32, and the engaging claw 32b of the lock cam 32 always presses the engaging member 30 of the cover 1 in the cover-closing direction.

Figure 12:
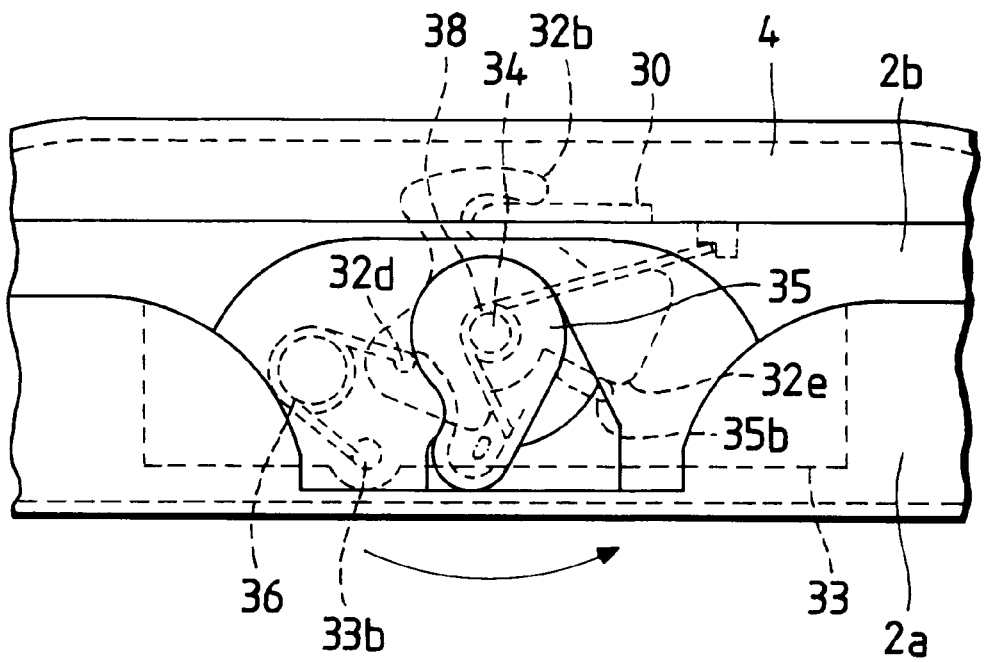
Figure 13:
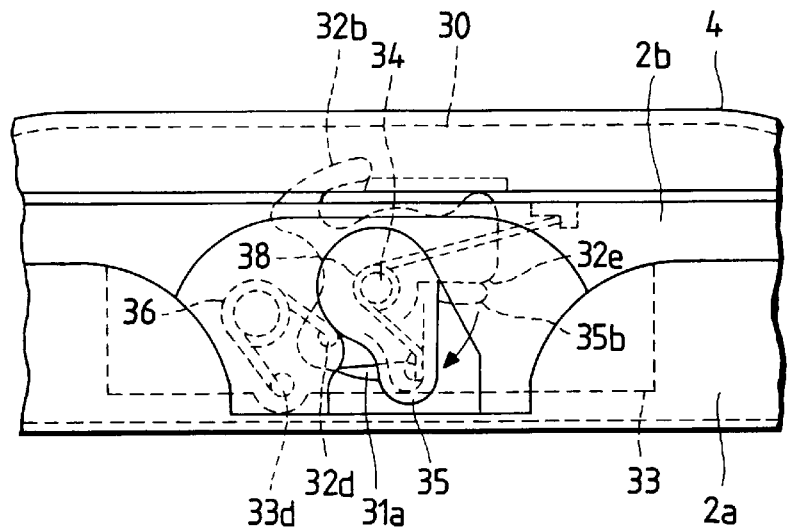

Further, a description will be made hereinbelow in terms of the operation of the lock mechanism from the cover-closing state to the cover-opening state. FIG. 12 shows the second biasing state due to the toggle spring 36 as well as the state as illustrated in FIG. 11. In this state, the operating lever 35 is rotationally biased clockwise about the rotating shaft 34 by the spring 38 so that a portion of the circumferential surface of the operating lever 35 is brought into contact with the inner wall of the center hole 31a of the control ornament 31 and the projection 35b comes into contact with or approaches the circumferential surface 32e of the lock cam 32. When opening the cover 1 from the FIG. 12 state, the operating lever 35 is operated to be rotated counterclockwise about the rotating shaft 34 in a direction as indicated by an arrow in FIG. 12 so that the projection 35b upwardly presses the circumferential surface 32e of the lock cam 32 to counterclockwise rotate the lock cam 32 against the clockwise biasing force of the toggle spring 36. When the lock cam 32 is rotated as shown in FIG. 13, the spring-operated portion 32d of the lock cam 32 is at the neutral position of the toggle spring 36 which is on the connection line between the axis of the rotating shaft 34 and the spring-supporting portion 33b. Even if the operating lever 35 is slightly rotated counterclockwise from the FIG. 13 state, the lock cam 32 is compulsively rotated counterclockwise by means of the biasing force of the toggle spring 36 so that the engaging claw 32b is disengaged with the engaging member 30 and the pressing portion 32c upwardly presses the engaging member 30, thereby taking the first biasing state due to the toggle spring 36 as illustrated in FIG. 7.

Here, the operating lever 35 is always rotationally biased clockwise by the spring 38, and when being released from fingers after the completion of the opening operation up to the FIG. 13 state, the operating lever 35 is pulled back up to the position at the cover-closed time by means of the resilience of the spring 38 compressed. Further, with the second biasing state of the toggle spring 36 taken when the cover 1 is in the closing state being always kept even after the cover 1 is closed, the cover 1 can stably take the closed relation to the tape recorder body 2. That is, even if the cover 1 comprises the primary cover portion 3 and the secondary cover portion 4, the above-described lock mechanism can surely provide the closed state between the cover 1 and the tape recorder body 2.

Figure 14:
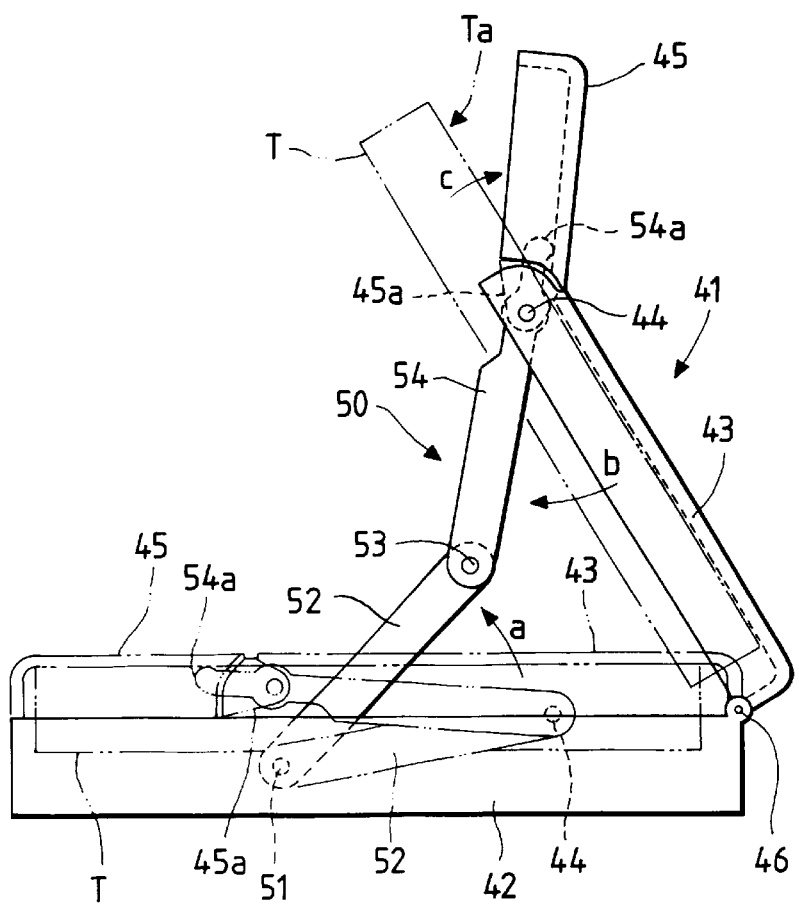
FIG. 14 is an illustration of a tape recorder having a cover apparatus according to a second embodiment of this invention.
Figure 15:
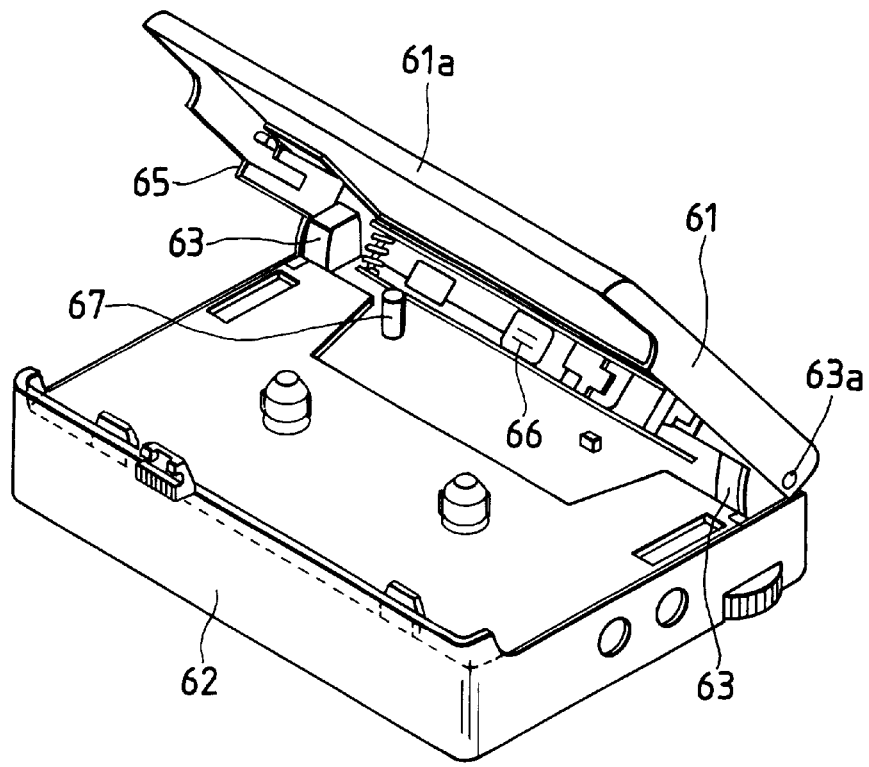
FIGS. 15 to 17 are illustrations for describing a conventional cover apparatus for a cassette tape recorder.
Figure 16:
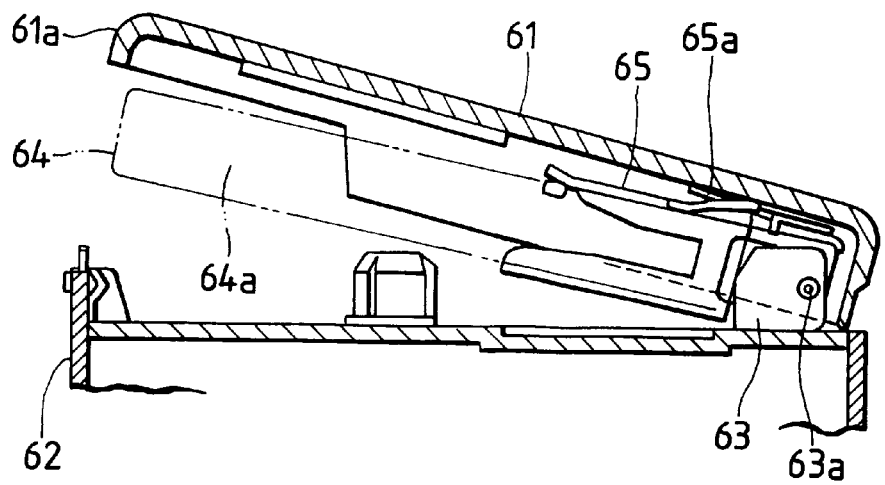
Figure 17:
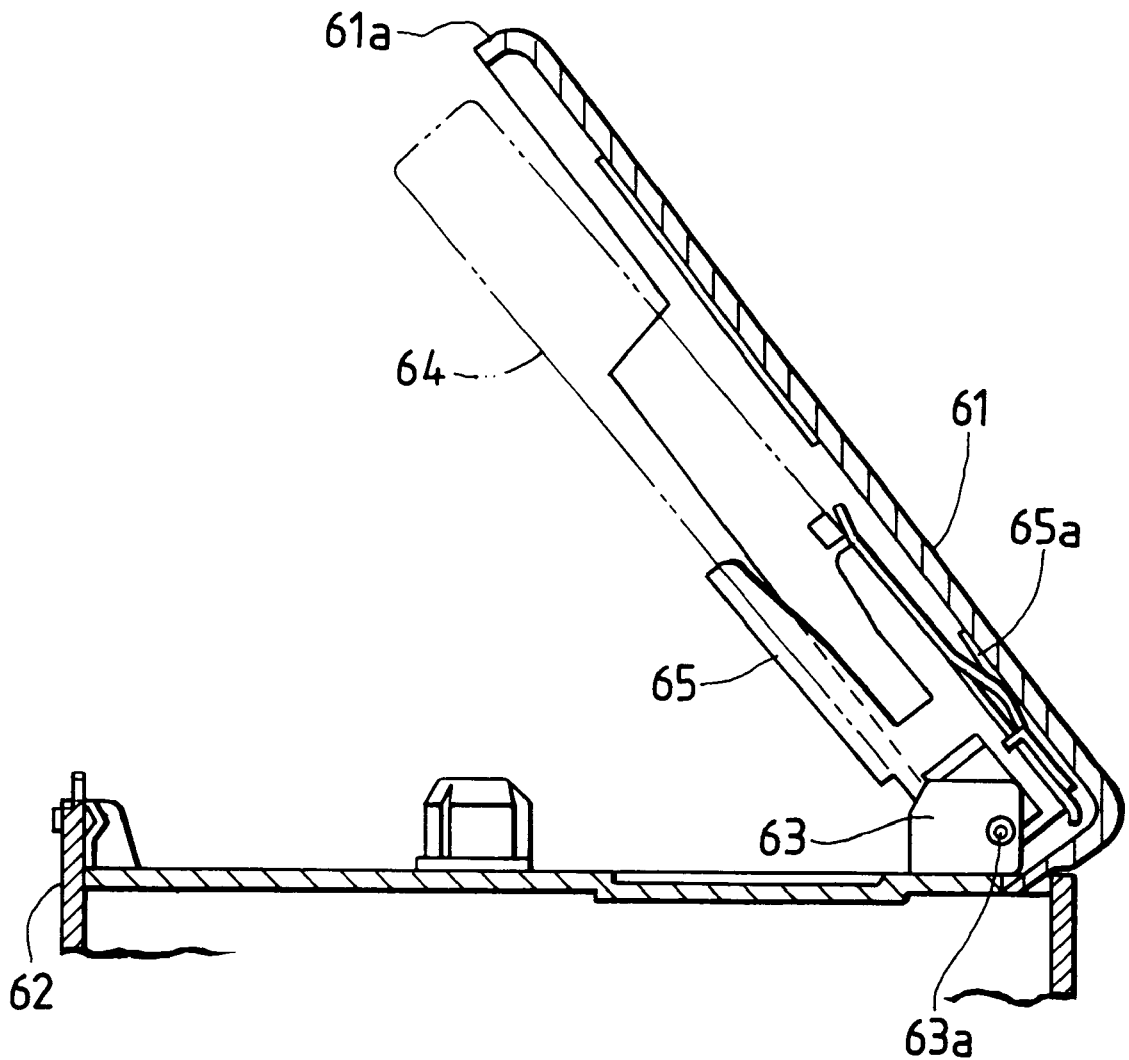

Another embodiment of this invention will be described hereinbelow with reference to FIG. 14. FIG. 14 shows a tape recorder having a cover apparatus according to this embodiment which is in the opening state and the closed state (indicated by virtual lines). In FIG. 14, designated at numeral 41 is a cover comprising two portions divided: a primary cover portion 43 is supported by a rotating supporting shaft 46 so as to be openable and closable with respect to a tape recorder body 42 and a secondary cover portion 45 a rear portion of which is rotatably supported by a shaft 44 provided in the primary cover portion 43. Here, the secondary cover portion 45 has an arm portion 45a the tip portion of which is rotatably supported by the shaft 44. A pair of arm mechanisms 50 is provided at both side portions of the tape recorder and between the tape recorder body 42 and the cover 41. Each of the pair of arm mechanisms 50 comprises a first arm 52 one end portion of which is rotatably supported by a shaft 51 planted in an inner side surface of the tape recorder body 42 and a second arm 54 one end portion of which is rotatably supported by the shaft 44 of the primary cover portion 43 and the other end portion of which is coupled through a shaft 53 to the other end portion of the aforementioned first arm 52. Here, the end portion of the second arm 54 rotatably supported by the shaft 44 extends beyond the shaft 44 portion to form an extension portion 54a, the upper surface of the extension portion 54a coming into contact with the inner surface of the secondary cover portion 44.

As indicated by the virtual lines in FIG. 14, similarly the tape cassette T is completely covered by the primary and secondary cover portions 43 and 45 at the time of taking the closed state. On the other hand, when opening the cover 41 from the closed state, the first arm 52 is rotationally moved in a direction indicated by a, and therefore the second arm 54 is rotationally moved in a direction indicated by b and the secondary cover portion 45 is pressed and opened in a direction indicated by c by means of the extension portion 54a of the second arm 54, thereby protruding or exposing a portion Ta of the tape cassette T. Thus, it is possible to easily take out the tape cassette T from holding members (not shown) by holding the protruding portion Ta of the tape cassette T. Here, in this second embodiment, it is possible to use a holder section and a lock mechanism similar to those in the above-described first embodiment.

Although in the above-described first and second embodiments the secondary cover portion is associated with the arm mechanism for opening and closing the primary cover portion, it is possible to manually slide or rotate the secondary cover portion to open and close the primary cover portion. Further, although in the above-described embodiments the holder section and head section are arranged to be rotated together with the cover, it is appropriate that the head section is provided at the tape recorder body side. Moreover, it is also appropriate that the cover is constructed with flat plates to constitute a portion of the upper surface of the tape recorder.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A cover apparatus of a cassette tape recorder comprising:
   a first cover rotatable to be openable and closable with respect to a body of said tape recorder, said first cover having holding means to encase a tape cassette so that said tape cassette encased in said holding means is rotatable in accordance with the rotation of said first cover, a length of said first cover in longitudinal directions being smaller than that of said tape cassette so that a portion of said tape cassette protrudes from said first cover when being encased in said holding means; and
   a second cover engaged with said first cover to be rotatable together with said first cover and movable along said first cover, said second cover rotating to cover the entire tape cassette in cooperation with said first cover when said first cover is closed with respect to said tape recorder body, and said second cover moving substantially in parallel with respect to said first cover to overlap with said first cover when said first cover is opened by a predetermined amount with respect thereto, so that the portion of said tape cassette protrudes from a tip portion of said second cover.

2. A cover apparatus as claimed in claim 1, wherein said second cover is manually rotatable so that said first cover is openable and closable with respect to said tape recorder body.

3. A cover apparatus as claimed in claim 1, further comprising an arm mechanism comprising a first arm one end portion of which is rotatably supported by said tape recorder body, a second arm one end portion of which is coupled to the other end portion of said first arm and the other end portion of which is rotatably supported by said first cover, and a third arm one end portion of which is coupled to a substantial center portion of said second arm and the other end portion of which is rotatably supported by said second cover, said arm mechanism rotating said first and second covers to cover the entire tape cassette when said first cover is closed with respect to said tape recorder body, and moving said second cover with respect to said first cover when said first cover is opened with respect thereto, so that the portion of said tape cassette protrudes from said tip portion of said second cover.

4. A cover apparatus as claimed in claim 1, further comprising a lock mechanism comprising an operating lever, a lock cam rotatably provided in said tape recorder body and an engaging member provided on said second cover, said lock cam being engageable with said engaging member when said first cover takes a closing state with respect to said tape recorder body, and disengageable therewith by an operation of said operating lever.

5. A cover apparatus as claimed in claim 4, further comprising a toggle spring coupled to said lock cam, said lock cam being biased by said toggle spring to bias said engaging member in a first direction that said second cover closes, when being engaged with said engaging member.

6. A cover apparatus as claimed in claim 5, wherein said lock cam is biased by said toggle spring in a second direction opposite to said first direction when being disengaged with said engaging member.

7. A cover apparatus of a cassette tape recorder comprising:

a first cover rotatable to be openable and closable with respect to a body of said tape recorder, said first cover having holding means to encase a tape cassette so that said tape cassette encased in said holding means is rotatable in accordance with the rotation of said first cover, a length of said first cover in longitudinal directions being smaller than that of said tape cassette so that a portion of said tape cassette protrudes from said first cover when being encased in said holding means; and a second cover coupled to said first cover to be rotatable together with said first cover and additionally rotatable independently of said first cover, said second cover rotating together with said first cover to cover the entire tape cassette in cooperation with said first cover when said first cover is closed with respect to said tape recorder body, and said second cover additionally and independently rotating when said first cover is opened by a predetermined amount with respect thereto, so that the portion of said tape cassette is released from the covering state by said second cover.

8. A cover apparatus as claimed in claim 7, further comprising an arm mechanism comprising a first arm one end portion of which is rotatably supported by said tape recorder body and a second arm one end portion of which is rotatably supported by said first cover and the other end portion of which is coupled to the other end portion of said first arm, the second arm including an extending portion extending to said second cover so as to rotate the second cover relative to said first cover when the second arm assumes a preselected angular position, said arm mechanism rotating said first and second covers to cover said tape cassette when said first cover is closed with respect to said tape recorder body, and additionally and independently rotating said second cover when said first cover is opened with respect thereto, so that the portion of said tape cassette is released from the covering state by said second cover.

9. A cover apparatus as claimed in claim 7, further comprising a lock mechanism comprising an operating lever, a lock cam rotatably provided in said tape recorder body and an engaging member provided on said second cover, said lock cam being engageable with said engaging member when said first cover takes a closing state with respect to said tape recorder body, and disengageable therewith by an operation of said operating lever.

10. A cover apparatus as claimed in claim 9, further comprising a toggle spring coupled to said lock cam, said lock cam being biased by said toggle spring to bias said engaging member in a first direction that said second cover closes, when being engaged with said engaging member.

11. A cover apparatus as claimed in claim 10, wherein said lock cam is biased by said toggle spring in a second direction opposite to said first direction when being disengaged with said engaging member.

12. A cover apparatus for a cassette tape recorder comprising:

a tape recorder casing;

tape cassette holding means for holding a tape cassette in said tape recorder casing;

a cover assembly covering said tape recorder casing, said cover assembly including a first cover and a second cover, the first cover retaining said tape cassette holding means and being rotatably supported by said tape recorder casing, the second cover being mounted on the first cover so as to partially overlap therewith; and cover sliding means, responsive to rotational motion of the first cover relative to said tape recorder casing, for sliding the second cover relative to the first cover so as to partially expose the tape cassette held in said tape cassette holding means outside said cover assembly.

13. A cover apparatus as set forth in claim 12, wherein said cover sliding means includes first, second, and third links, the first link pivotably connecting with said tape recorder casing, the second link pivotably connecting with the first cover of said cover assembly, the first and second links rotatably connecting with each other to allow said cover assembly to open relative to said tape recorder casing, the third link connecting between the second cover and the second link so as to allow the second cover to slide on the first cover according to pivotal movement of the second link according to the rotational motion of the first cover.

* * * * *